(12) United States Patent
Oh et al.

(10) Patent No.: US 8,208,450 B2
(45) Date of Patent: Jun. 26, 2012

(54) SUBSCRIBER INFORMATION MANAGEMENT SYSTEM AND METHOD FOR MOBILE COMMUNICATION SERVICE SYSTEM

(75) Inventors: Tae-Ho Oh, Seoul (KR); Young-In Cha, Seoul (KR); Yon-Hee Kim, Seoul (KR); Gi-Seon Nam, Seongnam-si (KR); O-Hyon Kwon, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 1097 days.

(21) Appl. No.: 11/573,978

(22) PCT Filed: Aug. 18, 2005

(86) PCT No.: PCT/KR2005/002728
§ 371 (c)(1),
(2), (4) Date: Mar. 27, 2008

(87) PCT Pub. No.: WO2006/019277
PCT Pub. Date: Feb. 23, 2006

(65) Prior Publication Data
US 2009/0022113 A1   Jan. 22, 2009

(30) Foreign Application Priority Data

Aug. 20, 2004 (KR) .................. 10-2004-0065848
Aug. 20, 2004 (KR) .................. 10-2004-0065849
Aug. 20, 2004 (KR) .................. 10-2004-0065868

(51) Int. Cl.
*H04W 4/00* (2009.01)
(52) U.S. Cl. ......... 370/338; 370/330; 370/401; 370/352
(58) Field of Classification Search .................. None
See application file for complete search history.

(56) References Cited

U.S. PATENT DOCUMENTS

| | | | | |
|---|---|---|---|---|
| 7,283,515 | B2* | 10/2007 | Fowler | 370/352 |
| 7,388,854 | B2* | 6/2008 | Lee et al. | 370/338 |
| 2004/0240393 | A1* | 12/2004 | Nishida et al. | 370/253 |
| 2005/0097248 | A1* | 5/2005 | Kelley | 710/72 |
| 2006/0005033 | A1* | 1/2006 | Wood | 713/182 |

(Continued)

FOREIGN PATENT DOCUMENTS

CN          1361609          7/2002

(Continued)

OTHER PUBLICATIONS

International Search Report of PCT/KR2005/002728.

(Continued)

*Primary Examiner* — Bob Phunkulh
(74) *Attorney, Agent, or Firm* — Lowe Hauptman Ham & Berner, LLP

(57) ABSTRACT

Disclosed are a subscriber information management system and a method for a mobile communication service system for managing subscriber information. System comprises a subscriber information management system for a mobile communication service system that a wire terminal and a wireless terminal respectively connected with an integrating and managing server and provides at least one portal service from the integrating and managing server, the system comprising: a subscriber information management unit, wherein the subscriber information management unit is included in the integrating and managing server, and links subscriber information transmitted from the wireless terminal with subscriber information transmitted from the wire terminal using a predetermined key value.

27 Claims, 2 Drawing Sheets

U.S. PATENT DOCUMENTS

2006/0293036 A1 * 12/2006 Zhou .......................... 455/415

FOREIGN PATENT DOCUMENTS

| JP | 09-224103 | 8/1997 |
| KR | 1020020054144 | 7/2002 |
| KR | 1020020063350 | 8/2002 |
| KR | 1020020078898 | 10/2002 |
| KR | 1020030027506 | 4/2003 |
| KR | 1020040008060 | 1/2004 |
| KR | 1020040041341 | 5/2004 |
| KR | 1020040072329 | 8/2004 |

OTHER PUBLICATIONS

Korean Office Action for 10-2004-0065849.
Korean Office Action for 10-2004-0065848.
Chinese Office Action for 201010166698.6 dated Dec. 21, 2011.

* cited by examiner

[Fig. 1]
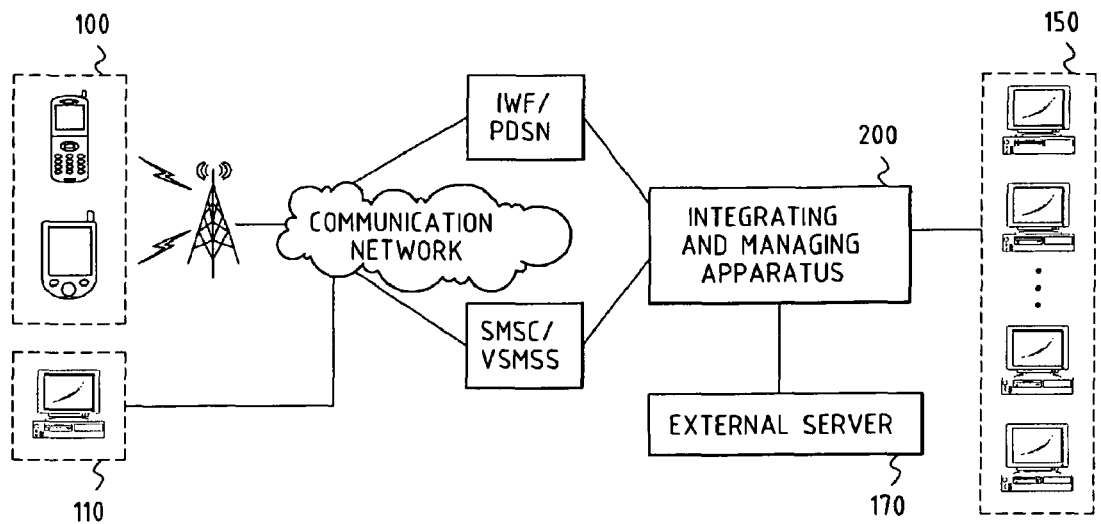
[Fig. 2]
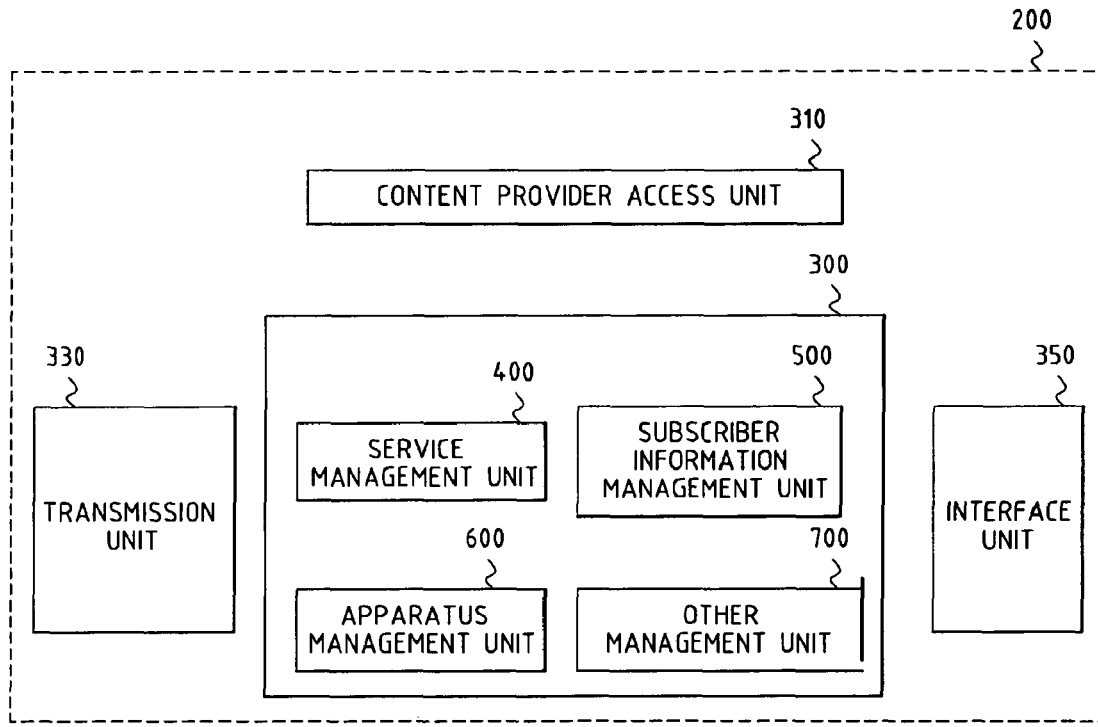

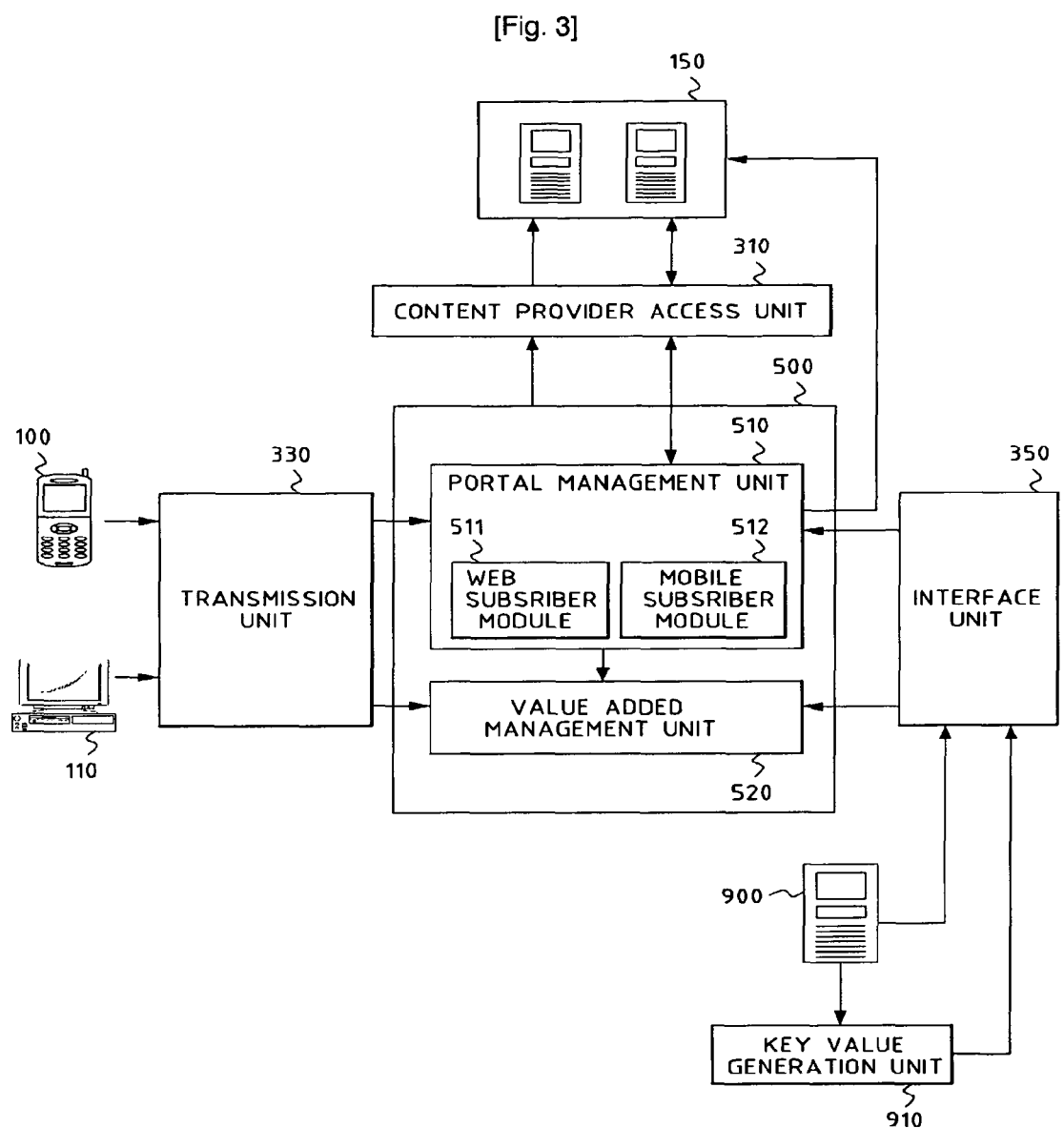

SUBSCRIBER INFORMATION MANAGEMENT SYSTEM AND METHOD FOR MOBILE COMMUNICATION SERVICE SYSTEM

CROSS REFERENCE TO RELATED APPLICATION

This application is the National Phase application of International Application No. PCT/KR2005/002728, filed Aug. 18, 2005, which designates the United States and was published in English. This application, in its entirety, is incorporated herein by reference.

TECHNICAL FIELD

The present invention relates to a mobile communication system, and more particularly, to a subscriber information management system and method for a mobile communication service system for managing subscriber information.

BACKGROUND ART

In recent, owing to developments of a wireless terminal, the wireless terminal doesn't limit to providing a voice communication. Particularly, a wireless terminal having a WAP (Wireless Application Protocol) function actively accesses to a gateway for accessing to information a user wishes to use. The user can obtain important information such as a flight time table, bell sound, a game and a real-time stock market price, etc through the wireless terminal having a WAP.

A mobile network operator has to satisfy an individual request of a content provider for providing a service subscriber and a wireless terminal of the service subscriber or a wire terminal with contents in order to meet various service request mentioned above.

DISCLOSURE OF INVENTION

Technical Problem

For the satisfaction of an individual request of a content provider, the mobile network operator has to provide a service subscriber of a wireless terminal with a client personalization service, an intuitional and an accessible user interface, an authenticity of security, convenient access, fast access to contents and a use of qualitative time.

Also the mobile network operator has to provide a content provider with a platform that drafts the regulation, can be expanded, satisfies requirements of a present content provider and applies on a progressive business and a technical circumstance rapidly and effectively.

In addition, the mobile network operator has to more effectively manage subscriber information in order to provide a wireless terminal subscriber with various content services mentioned above.

Technical Solution

Accordingly, it is an object of the present invention is to provide a subscriber information management system and method for a mobile communication service system for managing subscriber information that are able to link web subscriber information with mobile subscriber information.

It is another object of the present invention is to provide a subscriber information management system and method for a mobile communication service system that can reduce a dummy data subscriber information by separately managing the web subscriber information and subscriber information of a wireless terminal.

It is still another object of the present invention is to provide a subscriber information management system and method for a mobile communication service system that add a service management number which is a provisional key value, to subscriber information of a wireless terminal.

It is a more specific object of the present invention is to provide a subscriber information management system and method for a mobile communication service system that manage VAS (Value Added Service; referred to as "VAS" hereinafter) subscriber information storing and managing contents registered by each mobile communication subscriber.

It is a still further object of the present invention is to provide a subscriber information management system and method for a mobile communication service system that can manage VAS subscriber information in order to provide for cause of a subscriber authentication state/a subscriber joining state requested to a mobile communication service operator from a content provider.

It is an object of the present invention is to provide a subscriber information management system for a mobile communication service system that a wire terminal and a wireless terminal are respectively connected with an integrating and managing server and provides at least one portal service from the integrating and managing server, the system comprises a subscriber information management unit, wherein the subscriber information management unit is included in the integrating and managing server, and links subscriber information transmitted from the wireless terminal with subscriber information transmitted from the wire terminal using a predetermined key value.

Herein, the subscriber information management unit further comprises a portal management unit for storing and managing subscriber information of the wireless terminal and subscriber information of the wire terminal, performing a predetermined authentication process for discriminating whether a subscriber of the wire terminal is a subscriber of the wireless terminal and then linking subscriber information of the wireless terminal with subscriber information of the wire terminal; and an annexed service management unit for storing and managing subscriber information of a service provided from a content providing server.

Also the portal management unit comprises a web subscriber module for storing and managing subscriber information transmitted through a web connected by the wire terminal; and a mobile subscriber module for storing and managing information of a subscriber joined through a data communication of the wireless terminal.

In addition, the mobile subscriber module adds a service management number to a phone number of the wireless terminal in a great deal of subscriber information transmitted from the wireless terminal.

In addition, the subscriber information of the wire terminal includes a web ID/a password and a subscriber identification number.

In addition, the subscriber information of the wireless terminal includes a phone number of the wireless terminal and model information of the wireless terminal.

The subscriber information management system for a mobile communication service system further comprises a provisional server for storing and managing subscriber information of the wireless terminal and transmitting subscriber information to the integrating and managing server; and a key value generation unit for adding a service management number that is a provisional key value to the subscriber information.

It is another object of the present invention is to provide a subscriber information management system for a mobile communication service system, wherein the system comprises a portal management unit for storing and managing subscriber information of the wireless terminal and subscriber information of the wire terminal, performing a predetermined authentication process for discriminating whether a subscriber of the wire terminal is a subscriber of the wireless terminal and then linking subscriber information of the wireless terminal with subscriber information of the wire terminal in case of being authenticated.

It is still another object of the present invention is to provide a subscriber information management system for a mobile communication service system that a wire terminal and a wireless terminal respectively connected with an integrating and managing server and provides at least portal service from the integrating and managing server, wherein the system comprises a subscriber information management unit for storing subscriber information of a value added service in a portal service; and a content providing server for deciding an approval on a value added service of the wireless terminal based on the subscriber information stored at the subscriber information management unit.

Herein, the value added service needs an adult authentication.

In addition, the value added service is a billing service which a mobile communication service operator and a content provider all have to pay per use of the service.

The content providing server adds to the content whether the content providing server provides a value added service in case of registering the content to the integrating and managing server.

It is yet another object of the present invention is to provide a subscriber information management method for a mobile communication service system, wherein the method comprises steps of; (1) registering subscriber information transmitted from the wireless terminal; (2) registering subscriber information transmitted from the wire terminal; and (3) linking the subscriber information transmitted from the wireless terminal with the subscriber information transmitted from the wire terminal.

Herein, the method further comprises a step (4) of performing a predetermined authentication process for discriminating whether subscriber information of the wire terminal is subscriber information of the wireless terminal.

In addition, the predetermined authentication is performed through an SMS (Short Message Service).

In addition, the step (1) is performed by registering subscriber information of the wireless terminal in accordance with a simple registration rule.

It is yet another object of the present invention is to provide a subscriber information management method for a mobile communication service system which receives subscriber information of the wire terminal and the wireless terminal, wherein the method comprises (A) linking the subscriber information of the wireless terminal with the subscriber information of the wire terminal in the case that the subscriber information of the wireless terminal is pre-registered; and (B) adjusting a representative number from the subscriber information of the wireless terminal.

Herein, the step (A) is performed by adjusting a phone number according to the subscriber information of the wireless terminal as a representative number in the case that the subscriber information of the wireless terminal linked with the subscriber information of the wire terminal doesn't exist.

In addition, the step (B) is performed by adjusting a phone number of the wireless terminal designated from a user as a representative number in the case that at least one of the subscriber information of the wireless terminal linked with the subscriber information of the wire terminal exists.

In the other hand, it is yet another object of the present invention is to provide a subscriber information management method for a mobile communication service system that a wire terminal and a wireless terminal respectively connected with an integrating and managing server through a communication network and the integrating and managing server provides the wire terminal and the wireless terminal with a predetermined portal service, wherein the method comprising: (a) storing subscriber information of an annexed service, by the integrating and managing server; (b) identifying through the subscriber information stored in the step (a) in response to a value added service subscription inquiry requested from the content providing server, by the integrating and managing server; and (c) providing a wire terminal and/or a wireless terminal of a corresponding subscriber with the value added service in case of being joined in the identifying result of the step (b), by the content provider server.

Advantageous Effects

As described above, the present invention can provide various services to a subscriber, though the subscriber simply registered to only a web, for another terminal subscriber by separately managing the web subscriber information and subscriber information of a wireless terminal.

In addition, the present invention can map a piece of web subscriber information with subscriber information of a plurality of terminals by doing one web registration through a web subscriber module and registering respective terminal information to a mobile subscriber module even though one subscriber operates a plurality of terminals.

In addition, the present invention can decrease a data size of subscriber information because a dummy data doesn t need to be inserted into subscriber information by linking web subscriber information with mobile subscriber information.

In addition, the present invention can defuse a mismatch generated between a phone number of a wireless terminal subscriber and subscriber information by adding to subscriber information of a wireless terminal a service management number, which is a provisional key value.

And, the present invention enables a mobile communication service operator to provide a content provider and a mobile communication service subscriber with a reliable service by storing and managing subscriber information corresponding to a VAS joined through a wire terminal and a wireless terminal.

BRIEF DESCRIPTION OF THE DRAWINGS

The accompanying drawings, which are included to aid in understanding the invention and are incorporated into and constitute a part of this application, illustrate embodiment(s) of the invention and together with the description serve to explain the principles of the invention. In the drawings:

FIG. 1 illustrates a block diagram of a mobile communication system in accordance with the present invention;

FIG. 2 illustrates a block diagram of an integrating and managing unit in FIG. 1; and FIG. 3 illustrates a block diagram of a subscriber information management system for a mobile communication system in accordance with the present invention.

BEST MODE FOR CARRYING OUT THE INVENTION

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

Hereinafter, preferable embodiments according to the present invention will be described with reference to the accompanying drawings. Here, when one element is connected to another element, one element may be not only directly connected to another element but also indirectly connected to another element via another element.

Further, irrelative elements are omitted for clarity. Also, like reference numerals refer to like elements throughout.

FIG. 1 illustrates a block diagram of a mobile communication system in accordance with the present invention.

As depicted in FIG. 1, the mobile communication service system comprises a terminal 100 and 110, a communication network and an integrating and managing unit 200, and further comprises, as an additional application, at least one of a content providing server 150 and/or an external server 170.

The terminal 100 and 110 comprises a mobile communication terminal including a cellular phone having a wireless communication function and PDA (Personal Digital Assistant), and a computer having a wire communication function.

The content providing server 150 provides the terminal 100 and 110 with a service including contents composed of various data and an application program to through the mobile communication service system.

The integrating and managing unit 200, as a multiple platform, supports HP-UX, Sun Solaries, WebLogic, Oracle9iAS and SunONE Web Server. In addition, the integrating and managing unit 200 supports a worldwide regulation related to a wireless business.

Herein, the content providing server 150 is connected with the integrating and managing unit 200 through the communication network, and provides the terminal 100 and 110 with a service or contents provided by the service through the integrating and managing unit 200.

And, the external server 170 is connected with the integrating and managing unit 200, and a billing server is an example of the external server 170.

FIG. 2 illustrates a block diagram of an integrating and managing unit in FIG. 1.

As depicted in FIG. 2, the integrating and managing unit 200 has an open structure including a content provider access unit 310, a transmission unit 330, an interface unit 350 and a central management unit 300 and thus includes adaptability and modularity which can be embodied together with another solution.

The content provider access unit 310 provides a connection interface for connecting the content providing server 150 with the integrating and managing unit 200.

The connection interface provides an authentication of the connected content provider access unit 310, and communicates with the content providing server 150 in accordance with a predetermined regulation.

In addition, the content provider access unit 310 responds to an information inquiry request related to a service such as a subscribers profile joined the service and manages connection of the content providing server 150, the information inquiry request and regulation related to the content provider.

The central management unit 300 comprises a service management unit 400 for a service of the content provider, a subscriber information management unit 500 for managing subscriber information joining the service, an apparatus management unit 600 and other management unit 700 for performing other service administration and management related to an authentication.

The interface unit 350 comprises an interface (not shown) which can be communicated with an external server 170 interlocking with the integrating and managing unit 200 and an interface management unit (not show) requested to manage the interface.

FIG. 3 illustrates a block diagram of a subscriber information management system for a mobile communication system in accordance with the present invention.

As depicted in FIG. 3, in the subscriber information management system, a subscriber information management unit 500 receives subscriber information of a wire terminal 110 and a terminal 100 through a transmission unit 330, subscriber information of a provisional server 900 through an interface unit 350 and content subscriber information from a content providing server 150 through a content provider access unit 310.

In addition, the provisional server 900 further comprises a key value generation unit for adding a service management number that is a provisional key value to the subscriber information.

The subscriber information management unit 500 comprises a portal management unit 510 for managing a mobile communication subscriber and a portal service subscriber, and a value added service management unit 520 for managing content subscriber.

Herein, the portal management unit 510 comprises a web subscriber module 511 for storing and managing subscriber information joined through the wire terminal 110, and a mobile subscriber module 512 for managing subscriber information joined through the terminal 100.

The web subscriber module 511 manages subscriber information (update, registration, cancellation) transmitted from the wire terminal 110.

A web ID/a password and a subscriber identification number, etc are a specific example of the subscriber information of the wire terminal 110.

The mobile subscriber module 512 manages subscriber information (update, registration, cancellation) transmitted from the terminal 100.

A phone number of a mobile terminal and model information of the mobile terminal are a specific example of the subscriber information of the terminal 110.

The value added service management unit 520 stores and manages (registration, cancellation, modification) subscribers joining a VAS.

Herein, a mobile communication operator or a content provider adjusts the VAS.

Namely, the mobile communication operator stores and manages a VAS list registered by each mobile communication service subscriber.

At this time, the VAS is composed of one contents or a set of contents. And, the discrimination of a VAS is differently displayed by respective contents in accordance with the content providing server 150 in the case that a predetermined content is provided with the integrating and managing unit 200 from the content providing server 150. Accordingly, the integrating and managing unit 200 can easily recognize the discrimination of a VAS in accordance with respective contents. Also a mobile communication service operator can selects whether contents provided from the content providing server 200 is the VAS on occasion.

An adult service and a fixed charge service are a representative example of VAS as explained above in detail.

In case of an adult service, a mobile communication service operator has to perform a predetermined authentication process and then provide the service. Thus, the value added service management unit 520 stores information as to whether each mobile communication subscriber joins the contents for a subscriber authentication of the adult contents service because its service has to be only provided for a user more than a predetermined age.

Through the above process, decision of a service to a wireless terminal of the adult contents can be performed. Namely, information obtained through the authentication process is applied as a data of an adult authentication module.

Also in case of fixed charge service, the information obtained through the authentication process is used as a ground of adjustment in the future by individually managing the information because its service method is different from a general billing method. Thus, the value added service management unit 520 stores information as to whether each mobile communication subscriber joins the fixed charge service. Accordingly, the information is applied as a data of an adult authentication module of the fixed charge service subscription inquiry.

Aside from this, a subscriber server 900 manages subscriber information transmitted from a terminal agent, receives the subscriber information and simultaneously transmits the same to the portal management unit 510. A specific example of the subscriber server 900 is a phone number of a terminal, a subscriber identification number and terminal information, etc.

At this time, a key value generation unit 910 of the subscriber server 900 adds a service management number, which is a provisional key value, to subscriber information transmitted from the terminal agent. The key value generation unit 910 can defuse a mismatch by changing fluctuating information such as a telephone number, a subscriber name and a subscriber identification number, etc.

An important thing is that the integrating and managing unit 200 externally uses a worldwide standard such as a MIN/MDN, but the integrating and managing unit 200 and a system interlocked with the unit 200 internally uses a service management number.

On the other hand, the terminal 100 also can effectively manage subscriber information joining through the terminal 100 by using a phone of a terminal as a service management number in case of subscriber information transmitted from the terminal 100.

Hereinafter, a management method of a subscriber information management system for a mobile communication service system in accordance with a preferred embodiment of the present invention will be explained in detail.

1) In case of a subscriber through a web (a web subscriber module)

Web subscriber information registered through a wire terminal 110 is divided into two cases. One case is that the wire terminal 110 registers information related to a wireless terminal 100, and the other case is that the wire terminal 110 does not register information related to a wireless terminal 100.

First of all, a web subscriber performs an authentication process identifying that the web subscriber is the subscriber of the wireless terminal 100 in case of registering information related to a wireless terminal 100. The authentication process is performed through an SMS (Short Message Service). Accordingly, if the authentication process is passed, information in accordance with the authentication process is linked with subscriber information of a mobile subscriber module 512. At this time, a linking method can be performed by linking a subscriber identification number of the mobile subscriber module 512 and a terminal number, etc with a number corresponding to a key value. Accordingly, subscriber information of the linked mobile subscriber module 512 and subscriber information of a web subscriber module 511 can be used as one subscriber information.

On the other hand, simple web subscriber information is only registered in the case that the wire terminal 110 does not register information related to a wireless terminal 100.

2) In case of a subscriber through a wireless terminal (a mobile subscriber module)

A subscriber that joins through the wireless terminal 100 registers his/her subscriber information in accordance with a simple registration rule. Herein, the simple registration rule is a rule that if a subscriber press a call button of the wireless terminal 100 before the joining of a mobile communication service, subscriber information is registered at the mobile subscriber module 512 and the provision of the mobile communication service corresponding to the wireless terminal 100 is begun except for a call connection through a communication network.

And, a user is initiated by registering subscriber information on a web page for a link (namely, a link of subscriber information stored at a mobile subscriber module 512 with subscriber information stored at a web subscriber module 511) with a web in case of a subscriber through a wireless terminal 100.

On the other hand, one web subscriber information can be mapped with subscriber information of a plurality of terminals by linking web subscriber information with subscriber information of the wireless terminals 100 in the case that one subscriber operates a plurality of the wireless terminals 100.

Accordingly, the subscriber can be effectively provided with a billing service and a contents service, etc by adjusting a representative number among a plurality of the wireless terminals 100.

In addition, a method for registering the subscriber information at the value added service management unit 520 in accordance with another embodiment of the present invention is as follows.

1) A value added service registration in accordance with each subscriber through a wire terminal 100

If a mobile communication service subscriber joins a predetermined content providing server 150 through the wire terminal 110, information in accordance with the joining is transmitted to the content providing server 150 and the integrating and managing unit 200 stores subscriber information corresponding to contents, which the subscriber joins, at the value added service management unit 520.

2) A value added service registration in accordance with each subscriber through a wireless terminal 110

If a mobile communication service subscriber accesses the content providing server 150 through the wireless terminal 100 and requests a predetermined contents, the content providing server 150 inquires to the integrating and managing unit 200 whether the subscriber joins a mobile communication service and then gets the subscriber to register subscriber information of the contents.

Thereafter, the content providing server 150 transmits the subscriber information to the value added service management unit 520. At this time, the subscriber information is a VAS ID corresponding to a subscriber ID.

The value added service management unit 520 stores the subscriber information.

As explained above in detail, the integrating and managing unit 200 can decide an authentication of a contents affiliation inquiry module transmitted from the content providing server 150 using a contents ID in accordance with each subscriber stored at the value added service management unit 520.

The invention claimed is:

1. A subscriber information management system for a mobile communication service system that provides at least one portal service from an integrating and managing server connected to a wire terminal and a wireless terminal, the system comprising:
   a subscriber information management unit, the subscriber information management unit being included in the integrating and managing server for linking subscriber information transmitted from the wireless terminal with subscriber information transmitted from the wire terminal using a predetermined key value, wherein the subscriber information management unit comprises:
   a portal management unit for storing and managing the subscriber information of the wireless terminal and the subscriber information of the wire terminal, performing a predetermined authentication process for discriminating whether a subscriber of the wire terminal is a subscriber of the wireless terminal, and then linking the subscriber information of the wireless terminal with the subscriber information of the wire terminal; and
   a value added service management unit for storing and managing subscriber information of a service provided from a content providing server.

2. The system according to claim 1, wherein the portal management unit comprises: a web subscriber module for storing and managing the subscriber information transmitted through a web connected by the wire terminal; and a mobile subscriber module for storing and managing the subscriber information joined through a data communication of the wireless terminal.

3. The system according to claim 2, wherein the mobile subscriber module adds a service management number to a phone number of the wireless terminal in a great deal of subscriber information transmitted from the wireless terminal.

4. The system according to claim 1, wherein the subscriber information of the wire terminal includes a web ID/a password and a subscriber identification number.

5. The system according to claim 1, wherein the subscriber information of the wireless terminal includes a phone number of the wireless terminal and model information of the wireless terminal.

6. The system according to claim 1, further comprising:
   a provisional server for storing and managing the subscriber information of the wireless terminal and transmitting the subscriber information to the integrating and managing server; and
   a key value generation unit for adding a service management number, the service management number being a provisional key value, to the subscriber information.

7. A subscriber information management system for a mobile communication service system, the system comprising:
   a portal management unit for storing and managing subscriber information of a wireless terminal and subscriber information of a wire terminal, performing a predetermined authentication process for discriminating whether a subscriber of the wire terminal is a subscriber of the wireless terminal, and then linking the subscriber information of the wireless terminal with the subscriber information of the wire terminal in case of being authenticated;
   a provisional server for storing and managing the subscriber information of the wireless terminal and transmitting the subscriber information to an integrating and managing server; and
   a key value generation unit for adding a service management number, a service management number being a provisional key value, to the subscriber information.

8. The system according to claim 7, wherein the portal management unit comprises:
   a web subscriber module for storing and managing the subscriber information transmitted through a web connected by the wire terminal; and
   a mobile subscriber module for storing and managing information of a subscriber joined through a data communication of the wireless terminal.

9. The system according to claim 7, wherein the subscriber information of the wire terminal includes a web ID/a password and a subscriber identification number.

10. The system according to claim 7, wherein the subscriber information of the wireless terminal includes a phone number of the wireless terminal and model information of the wireless terminal.

11. The system according to claim 7, wherein the predetermined authentication process is performed through an SMS (Short Message Service).

12. A subscriber information management system for a mobile communication service system provides at least portal service from an integrating and managing server connected to a wire terminal and a wireless terminal, the system comprising:
   a subscriber information management unit for storing subscriber information of a value added service in a portal service; and
   a content providing server for deciding an approval on a value added service of the wireless terminal based on the subscriber information stored at the subscriber information management unit;
   a provisional server for storing and managing the subscriber information of the wireless terminal and transmitting the subscriber information to an integrating and managing server; and
   a key value generation unit for adding a service management number, a service management number being a provisional key value, to the subscriber information.

13. The system according to claim 12, wherein the subscriber information includes subscriber information of a value added service transmitted from the wire terminal.

14. The system according to claim 12, wherein the subscriber information includes subscriber information of a value added service transmitted from the content providing server using the wireless terminal.

15. The system according to claim 12, wherein the value added service needs an adult authentication.

16. The system according to claim 12, wherein the value added service is a billing service which a mobile communication service operator and a content provider all have to pay per use of the service.

17. The system according to claim 12, wherein the content providing server adds to a content whether the content providing server provides a value added service in case of registering the content to the integrating and managing server.

18. A subscriber information management method for a mobile communication service system, the method comprising:
  registering subscriber information transmitted from a wireless terminal;
  registering subscriber information transmitted from a wire terminal; and
  linking the subscriber information transmitted from the wireless terminal with the subscriber information transmitted from the wire terminal, wherein the linking of the subscriber information is performed by adjusting a phone number according to the subscriber information of the wireless terminal as a representative number in the case that the subscriber information of the wireless terminal linked with the subscriber information of the wire terminal doesn't exist.

19. The method according to claim 18, the method further comprising:
  performing a predetermined authentication process for discriminating whether the subscriber information of the wire terminal is the subscriber information of the wireless terminal.

20. The method according to claim 19, wherein the predetermined authentication process is performed through an SMS (Short Message Service).

21. The method according to claim 18, wherein the registering of the subscriber information transmitted from the wireless terminal is performed by registering the subscriber information of the wireless terminal in accordance with a simple registration rule.

22. A subscriber information management method for a mobile communication service system which receives subscriber information of a wire terminal and a wireless terminal, the method comprising:
  linking the subscriber information of the wireless terminal with the subscriber information of the wire terminal in the case that the subscriber information of the wireless terminal is pre-registered; and
  adjusting a representative number from the subscriber information of the wireless terminal, wherein the adjusting of the representative number is performed by adjusting a phone number of the wireless terminal designated from a user as a representative number in the case that at least one of the subscriber information of the wireless terminal linked with the subscriber information of the wire terminal exists.

23. The method according to claim 22, wherein the-linking of the subscriber information is performed by adjusting a phone number according to the subscriber information of the wireless terminal as a representative number in the case that the subscriber information of the wireless terminal linked with the subscriber information of the wire terminal doesn't exist.

24. The method according to claim 22, wherein the subscriber information of the wireless terminal is registered in accordance with a simple registration rule.

25. A subscriber information management method for a mobile communication service system, a wire terminal and a wireless terminal being respectively connected with an integrating and managing server through a communication network, wherein the integrating and managing server provides the wire terminal and the wireless terminal with a predetermined portal service, the method comprising steps of:
  (a) storing subscriber information of an annexed service, by the integrating and managing server;
  (b) identifying through the subscriber information stored in the step (a) in response to a value added service subscription inquiry requested from a content providing server, by the integrating and managing server; and
  (c) providing the wire terminal and/or the wireless terminal of a corresponding subscriber with the value added service in case of being joined in the identifying result of the step (b), by the content provider server.

26. The system according to claim 25, wherein the subscriber information of the value added service includes subscriber information of a value added service transmitted from the wire terminal.

27. The system according to claim 25, wherein the subscriber information includes subscriber information of a value added service for wireless terminal transmitted from the content providing server.

\* \* \* \* \*